(12) United States Patent
Sumiya et al.

(10) Patent No.: US 6,671,360 B2
(45) Date of Patent: Dec. 30, 2003

(54) INTERCOM SYSTEM FOR A BUILDING OR APARTMENT HOUSE

(75) Inventors: Hiroshi Sumiya, Nagoya (JP); Tatsuru Shinozaki, Nagoya (JP); Kengo Nakata, Nagoya (JP)

(73) Assignee: Aiphone Co., Ltd. (JP)

( * ) Notice: Subject to any disclaimer, the term of this patent is extended or adjusted under 35 U.S.C. 154(b) by 0 days.

(21) Appl. No.: 09/960,302

(22) Filed: Sep. 24, 2001

(65) Prior Publication Data

US 2002/0176556 A1 Nov. 28, 2002

(30) Foreign Application Priority Data

May 23, 2001 (JP) ........................................ 2001-154386

(51) Int. Cl.[7] ............................................... H04M 9/00
(52) U.S. Cl. ........................... 379/167.15; 379/167.01; 379/167.14; 379/171
(58) Field of Search ...................... 379/167.01, 406.08, 379/391, 88.01–88.03, 159, 167.15, 167.02, 167.04, 167.05, 168, 171, 167.07, 167.14; 370/286; 326/82, 86, 30

(56) References Cited

U.S. PATENT DOCUMENTS

| 4,563,886 | A | * | 1/1986 | Kletzmaier et al. |
| 5,506,896 | A | * | 4/1996 | Hoffman |
| 5,898,756 | A | * | 4/1999 | Manning et al. |
| 6,037,805 | A | * | 3/2000 | Kuroda et al. |
| 6,058,174 | A | * | 5/2000 | Borshchevsky |
| 6,125,139 | A | * | 9/2000 | Hendrickson et al. |

* cited by examiner

Primary Examiner—Curtis Kuntz
Assistant Examiner—Barry W. Taylor
(74) Attorney, Agent, or Firm—Lorusso, Loud & Kelly (57) ABSTRACT

An intercom system for a building or apartment house includes at least one main entrance station 1 which is installed at an entrance or the like of a building or an apartment house, a plurality of residential master stations 2 which are respectively installed inside a plurality of residences in the building or apartment house for receiving calls and talking with the main entrance station 1, a common line 3 which connects the main entrance station 1 and respective residential master stations 2 in parallel, a line power supply 4 which supplies direct current power, for example, DC 24 V to the main entrance station 1 and respective residential master stations 2 through the common line 3, an electronic door lock 5 which is connected to the main entrance station 1 for locking and releasing an entrance door of a main entrance, and a plurality of call switches 6 connected to respective residential master stations 2 and mounted on front doors of respective residences for operation by a visitor. A series resistance and capacitance forming a frequency response leveling circuit 52 is connected across a choke circuit 51 in the line power supply 4 to eliminate frequency dependent impedance differences found to interfere with feedback cancellation and howling control.

8 Claims, 3 Drawing Sheets

INTERCOM SYSTEM FOR A BUILDING OR APARTMENT HOUSE

CROSS-REFERENCE TO RELATED APPLICATIONS

This application claims, under 35 USC 119, priority of Japanese Application No. 2001-154386 filed May 23, 2001.

BACKGROUND OF THE INVENTION (1) Field of the Invention

The present invention relates to an intercom system for a building or an apartment house, and more particularly to an intercom system for a building or an apartment house which can achieve power saving by suppressing current consumption and, at the same time, can ensure favorable talking quality by preventing the occurrence of howling.

(2) Description of the Related Art

Figure 3:
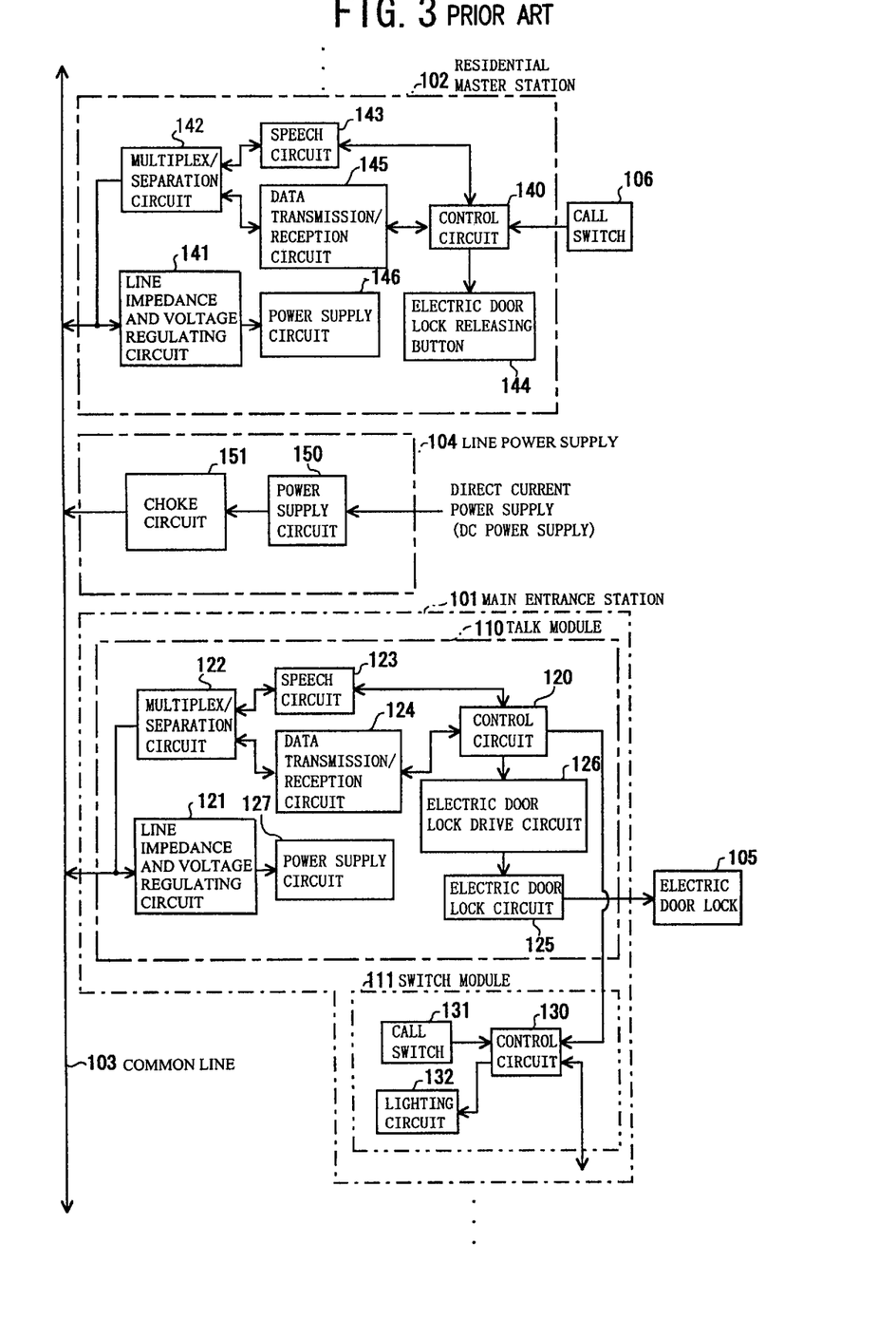
FIG. 3 is a block diagram showing the structure of a conventional intercom system for a building or an apartment house.

A conventional intercom system for a building or an apartment house has a structure as shown in a block diagram of FIG. 3.

The intercom system for a building or an apartment house shown in the drawing has at least one main entrance station 101, a plurality of residential master stations 102, 102, ... which are respectively installed inside of a plurality of residences in a building or an apartment house, a common line 103 connecting the main entrance station 101 and respective residential master stations 102, 102, ... in parallel, a line power supply 104 for supplying a direct current power supply (DC power supply) to the main entrance station 101 and respective residential master stations 102, 102, ... in parallel through the common line 103, an electronic door lock 105 which is connected to the main entrance station 101 for locking and releasing an entrance door of a the building or apartment house, and a plurality of call switches 106, 106, ... which are connected to respective residential master stations 102, 102, ... and are mounted on front doors of respective residences (hereinafter referred to as "residential front doors") for operation by a visitor to the residence.

In the drawing, the main entrance station 101 comprises a talk module 110 which includes a control circuit 120, a line impedance and voltage regulating circuit 121, a multiplex/separation circuit 122, a speech circuit 123, a data transmission/reception circuit 124, an electric door lock circuit 125, an electric door drive circuit 126 and a power supply circuit 127, and at least one switch module 111 which includes a control circuit 130, a call switch 131, and a lighting circuit 132.

Further, each residential master station 102, 102, ... includes a control circuit 140, a line impedance and voltage regulating circuit 141, a multiplex/separation circuit 142, a speech circuit 143, an electric door lock releasing button 144, a data transmission/reception circuit 145 and a power supply circuit 146.

Further, the line power supply 104 includes a power supply circuit 150 and a choke circuit 151.

In the intercom system for a building or an apartment house having such a structure, the choke circuit 151 of the line power supply 104 supplies stabilized direct current power such as DC 24 V, for example, to the common line 103 from the power supply circuit 150. This direct current power is supplied as standby operational power to the power supply circuit 127 through the line impedance and voltage regulating circuit 121 of the talk module 110 of the main entrance station 101 and to the power supply circuits 146 through the line impedance and voltage. regulating circuits 141 of respective residential master stations 102, 102 When a visitor standing at the entrance of the building or apartment house operates the call switch 131 of the switch module 111 of the main entrance station 101 to call a resident living in a specified residence, a calling data signal is output from the control circuit 130 in response to operation of the call switch and is transmitted to respective residential master stations 102, 102, . . . through the control circuit 120, the data transmission/reception circuit 124, the multiplex/separation circuit 122 of the talk module 110 and the common line 103.

In respective residential master stations 102, 102, . . . , the control circuit 140 compares an address which forms the calling data signal which is received through the common line 103, the multiplex/separation circuit 142 and the data transmission/reception circuit 145 with a preset address at its own terminal. If these addresses agree with each other, the control circuit 140 generates a calling tone by means of a speaker (not shown in the drawing) in the speech circuit 143 so that the resident in the called residence is informed of the call from the visitor standing at the entrance of the building or apartment house.

Upon hearing the calling tone generated by the speaker (not shown in the drawing) in the speech circuit 143 of the residential master station 102, the resident living in the called residence of the building or apartment house picks up a handset (not shown in the drawing) in the speech circuit 143. The control circuit 140 detects this pick up of the handset to activate the speech function (detailed explanation thereof being omitted) of the speech circuit 143 and to transmit a response data signal to the talk module 110 of the main entrance station 101 through the data transmission/reception circuit 145, the multiplex/separation circuit 142 and the common line 103.

In the speech module 110 of the main entrance station 101, the control circuit 120 detects the response data signal which is received through the common line 103, the multiplex/separation circuit 122 and the data transmission/reception circuit 124 and activates the speech function (detailed explanation thereof being omitted) of the speech circuit 123. Accordingly, a speech path (detailed explanation being omitted) is established between a microphone and a speaker (not shown in the drawing) which form the speech circuit 123 and the handset (not shown in the drawing) of the speech circuit 143 of the residential master station 102 to enable transmitting and receiving speech signals through this speech path.

Subsequently, when the resident living in the called residence operates the electric door lock releasing button 144 of the residential master station 102 for releasing the electric door lock 105 mounted on the front door at the main entrance, a release data signal is output from the control circuit 140 and is transmitted to the control circuit 120 of the talk module 110 of the main entrance station 101 through a path similar to the path for the above-mentioned response data signal.

Further, the control circuit 120 of the talk module 110 of the main entrance station 101 detects the lock release data signal transmitted from the residential master station 102 and controls the electric door lock drive circuit 126 so as to drive the electric door lock circuit 125 to release the electric door lock 105.

However, in the conventional intercom system for a building or an apartment house, the choke circuit 151 of the line power supply 104 has given frequency characteristics and hence, when the speech signals for establishing the talk are transmitted to the common line 103, the frequency characteristics of the choke circuit 151 cause feedback of the speech signals so that it is difficult to cancel the feedback speech signals at the speech circuit 123 of the talk module 110 in the main entrance station 101 and at the speech circuit 143 of the called residential master station 102 whereby there exists a drawback that howling can be generated.

Further, in the line impedance and voltage regulating circuit 121 of the talk module 110 which forms the main entrance station 101 and in the line impedance and voltage regulating circuits 141 of respective residential master stations 102, 102, . . . , the power supply voltage from the line power supply 104 is set to a high value to ensure a dynamic range with a standby current value. At the same time, the electric door lock circuit 125 of the talk module 110 in the main entrance station 101 is driven at a stabilized low-level voltage through the electric door lock drive circuit 126 by the control circuit 120 so as to lock and release the electric door lock 105. Accordingly, there is a drawback that the current consumption is increased in the talk module which is operated by voltage stabilized through the power supply circuit 127, for example DC 5 V.

Further, when the call switch 106 mounted at the residential front door or the call switch 131 at the main entrance is operated, the calling tone is generated by the speaker (not shown in the drawing) in the speech circuit 143 controlled by the control circuit 140 of the residential master station 102 detecting the calling operation. Accordingly, current consumption is increased in the residential master station operated by voltage stabilized through the power supply circuit 146, for example DC 5 V.

The present invention has been made to solve the above-mentioned drawbacks and it is an object of the present invention to provide an intercom system for a building or an apartment house which can achieve the power saving by suppressing current consumed at the time of calling initiated by a visitor standing at a main entrance of a building or an apartment house or a residential front door or at the time of releasing an electric door lock mounted on a front door of the main entrance of the building or apartment house and, at the same time, can ensure the favorable talk quality by suppressing howling.

SUMMARY OF THE INVENTION

To achieve the above-mentioned object, an intercom system for a building or an apartment house according to the present invention includes at least one main entrance station with a talk module for calling and talking and at least one switch module connected to the talk module and having a call switch for selecting a residential station, a line power supply for supplying power to a common line, a plurality of residential master stations for receiving calls and talking with the main entrance station on the common line in parallel. The line power supply includes a choke circuit for increasing an AC impedance to a high impedance, the talk module of the main entrance station includes a speech circuit having a load resistance which is connected to the common line, and each residential master station includes a speech circuit having a load resistance which is connected to the common line. Further, in the intercom system for a building or an apartment house of the present invention the choke circuit of the line power supply is provided with a frequency response leveling circuit.

According to the intercom system for a building or an apartment house having such a structure, by connecting the speech circuits having the load resistances in series with the line impedance and voltage regulating circuit of the talk module which forms the main entrance station and the line impedance and voltage regulating circuits of respective residential master stations which are connected to the common line in parallel, it becomes possible to sufficiently cancel the feedback tone signals without receiving the influence of the alternating current impedance which the common line has so that the generation of howling can be prevented.

Further, in the intercom system for a building or an apartment house of the present invention, the talk module of the main entrance station and the residential master stations are respectively provided with line impedance and voltage regulating circuits for increasing input impedance at the standby state to a high impedance and the line impedance and voltage regulating circuits are respectively provided with fixed voltage circuits.

According to the intercom system for a building or an apartment house having such a structure, when the main entrance station and the residential master stations receive the direct current power from the line power supply, the line impedance and voltage regulating circuits respectively perform constant-current operations due to controls performed by the fixed voltage circuits and hence, even when the main entrance station, the residential master station and the line power supply are connected to the common line in parallel, the lowering of the alternating impedance to the common line is prevented.

According to the intercom system for a building or an apartment house having such a structure, an AC impedance in a high range is suppressed by the frequency response leveling circuit which is connected to the choke circuit of the line power supply in parallel and hence, even when the frequency to the direct current power supply becomes high, the AC impedance to the common line is only increased up to a given impedance.

Further, in the intercom system for a building or an apartment house of the present invention, the talk module of the main entrance station compnrises a constant-current electric door lock drive circuit for driving an electric door lock circuit which locks and releases an electric door lock.

According to the intercom system for a building or an apartment house having such a structure, the power supply to the constant-current electric door lock drive circuit of the talk module of the main entrance station can be performed such that, without using a low-level voltage which is stabilized in the talk module, the constant-current is a small current value is supplied from the common line so as to drive the electric door lock circuit thus locking and releasing the electric door lock whereby the power saving can be achieved.

Further, each residential master station of the intercom system for a building or an apartment house of the present invention comprises a piezoelectric element circuit which generates a calling tone upon operation of a call switch which is installed at a residential front door.

According to the intercom system for a building or an apartment house having such a structure, the power supply to the piezoelectric element circuit of the residential master station which informs of the operation of the call switch with the generation of call tone can be performed such that, without using a low-level voltage which is stabilized in the residential master station, the constant-current to be a small current value is supplied based on the direct current power supply from the common line so as to drive the piezoelectric element circuit whereby the power saving can be achieved.

DESCRIPTION OF THE PREFERRED EMBODIMENTS

Embodiments of a preferred mode for carrying out the present invention to which an intercom system for a building or an apartment house according to the present invention is applied are explained in conjunction with attached drawings.

Figure 1:
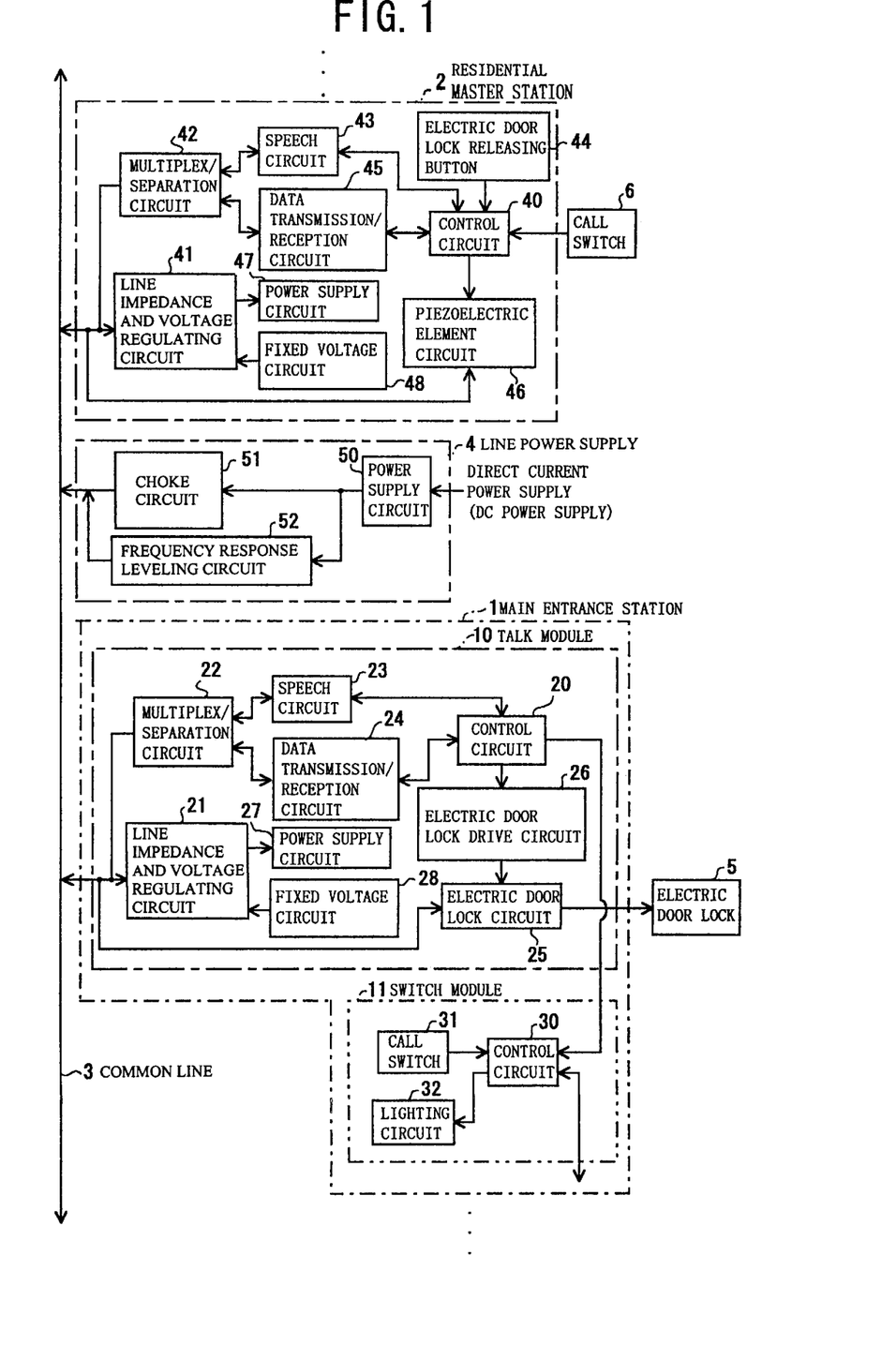
FIG. 1 is a block diagram showing the structure of an intercom system for a building or an apartment house according to one embodiment of the present invention.

FIG. 1 is a block diagram showing the structure of an intercom system for a building or an apartment house according to one embodiment of the present invention. As shown in the drawing, the intercom system for a building or an apartment house comprises at least one main entrance station 1 which is installed at an entrance or the like of a building or an apartment house ("hereinafter referred to as "main entrance"), a plurality of residential master stations 2, 2, . . . which are respectively installed inside a plurality of residences in the building or apartment house for receiving calls and talking with the main entrance station 1, a common line 3 which connects the main entrance station 1 and respective residential master stations 2, 2, . . . in parallel, a line power supply 4 which supplies direct current power (DC power supply), for example, DC 24V to the main entrance station 1 and respective residential master stations 2, 2, . . . through the common line 3, an electronic door lock 5 which is connected to the main entrance station 1 for locking and releasing an entrance door of a main entrance, and a plurality of call switches 6, 6, . . . connected to respective residential master stations 2, 2, . . . and mounted on front doors of respective residences (hereinafter referred to as "residential front doors") for operation by a visitor.

In the drawing, the main entrance station 1 comprises a talk module 10 which is connected to the common line 3 and performs calling and talking and at least one switch module 11 which is connected to the talk module 10 and performs station selection calling.

Further, talk module 10 comprises a control circuit 20 which controls circuit operation inside of the talk module 10. A reactance transistor circuit, i.e. line impedance and voltage regulating circuit 21, is connected to the common line 3 and has an input impedance in the standby state at a high impedance, for example, 9–10 kΩ. A multiplex/separation circuit 22 establishes signal transmission paths between the common line 3 and a speech circuit 23 and between the common line 3 and a data transmission/reception circuit 24 which will be described later. The multiplex/separation circuit 22 multiplexes or separates various signals (data signals, speech signals and the like) which are transmitted and received. The speech circuit 23 is controlled by the control circuit 20 and enables talking with a visitor at the main entrance. The data transmission/reception circuit 24 establishes a signal transmission path between the control circuit 20 and the multiplex/separation circuit 22 and transmits and receives various signals. An electric door lock circuit 25 is connected to the common line 3 and locks and releases the electric door lock 5. A constant-current electric door lock drive circuit 26 drives the electric door lock circuit 25 based on the control performed by the control circuit 20. A power supply circuit 27 is connected to the reactance transistor circuit 21 and supplies operating power to the circuits inside of the talk module 10 except for the electric door lock circuit 25 and the constant-current electric door lock drive circuit 26. A fixed voltage circuit 28 ensures a dynamic range of the reactance transistor circuit 21.

Further, switch module 11 includes a control circuit 30 which is connected to the control circuit 20 of the talk module 10 for controlling the circuit operation inside of the switch module 11. A call switch 31 can be operated by a visitor to select and call a residential station from the main entrance. A lighting circuit 32 is arranged in parallel to the call switch 31. Here, the control circuit 30 is connected in series with control circuits 30 (not shown in the drawing) of other switch modules 11.

In the drawing, each residential master station 2, 2, . . . comprises a control circuit 40 which controls circuit operation inside the residential master station 2. A reactance transistor circuit, i.e. a line impedance and voltage regulating circuit 41, is connected to the common line 3 and has an input impedance in the standby state at a high impedance, for example, 90–100 kΩ. A multiplex/separation circuit 42 establishes a signal transmission path between the common line 3 and a speech circuit 43 and between the common line 3 and a data transmission/reception circuit 45 which will be described later. The multiplex/separation circuit 42 multiplexes or separates various signals which are transmitted and received. The speech circuit 43 is controlled by the control circuit 40 to enable talking by a resident inside the residence. An electric door lock releasing button 44 can be operated by the resident inside the residence to release the electric door lock 5 installed at the main entrance. The data transmission/ reception circuit 45 establishes a signal transmission path between the control circuit 40 and the multiplex/separation circuit 42 and transmits and receives various signals. A piezoelectric element circuit 46 is connected to the common line 3 and generates.a call tone under control by the control circuit 40 to inform the resident of the operation of the call switch 6 installed at the residential front door or the operation of the call switch 31 of the switch module 11 at the main entrance station 1. A power supply circuit 47 is connected to the reactance transistor circuit 41 and supplies operating power to the circuits inside the residential master station 2 except for the piezoelectric element circuit 46. A fixed voltage circuit 48 ensures a dynamic range of the reactance transistor circuit 41.

In the drawing, the line power supply 4 includes a power supply circuit 50 for stabilizing a direct current power supply, a passive reactance circuit, i.e. choke circuit 51, connected with the direct current power supply from the power supply circuit 50 for increasing output impedance to the common line 3 to a high impedance, for example, 200–300Ω, and a frequency response leveling circuit 52 connected in parallel to the passive reactance circuit 51 for leveling or limiting the frequency characteristics of the passive reactance circuit 51.

Figure 2:
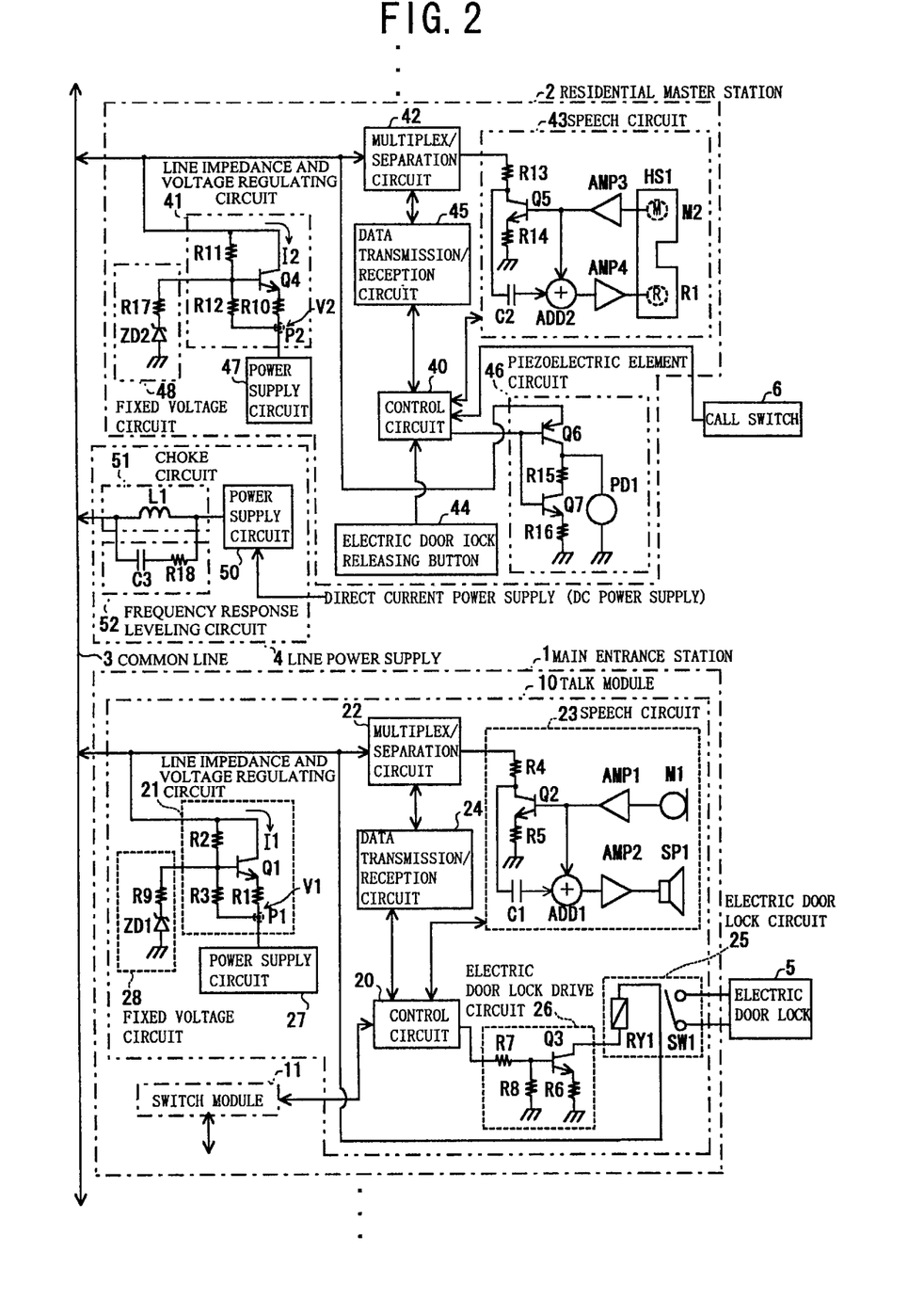
FIG. 2 is a circuit block diagram showing the specffic structure of the intercom system for a building or an apartment house according to one embodiment of the present invention.

FIG. 2 is a circuit block diagram of a specific structure of the intercom system for a building or an apartment house according to one embodiment of the present invention.

In the talk module 10 of the main entrance station 1 shown in the drawing, the reactance transistor circuit 21 includes a NPN type transistor Q1 which has a collector connected to the common line 3, an emitter connected to the power supply circuit 27 through a resistance R1 and a base thereof connected to a resistance R9 of a fixed voltage circuit 28 which will be described later. Resistances R2, R3 are respectively inserted between the base and the collector and between the base and a connection point P1 where the resistance R1 is connected to the power supply circuit 27.

Further, the speech circuit 23 includes a microphone M1 and a speaker SP1 to enable a visitor at the main entrance to talk to the resident living in the residence. A microphone amplifier AMP1 amplifies speech signals generated from tones input to the microphone M1. A speaker amplifier AMP2 amplifies received speech signals to drive the speaker SP1 and generate tones. A NPN type transistor Q2 has a collector connected to the common line 3 through a load resistance R4 and the multiplex/separation circuit 22 and connected to the speaker amplifier AMP2 through a capacitance C1 and an adder circuit ADD1. An emitter of the transistor Q2 is connected to a reference potential point through a resistance R5 and a base of the transistor Q2 is connected to the microphone amplifier AMP1. The adder circuit ADD1 is connected to a connection point between the base of the transistor Q2 and the microphone amplifier AMP1.

Further, the electric door lock circuit 25 includes an electric door lock switch SW1 which is changed over for locking and releasing the electric door lock 5 and an electric door lock relay RY1 which has both ends thereof respectively connected to the common line 3 and a collector of a NPN type transistor Q3 of the constant-current electric door lock drive circuit 26 which will be explained later and is turned on or off to change over the electric door lock switch SW1.

Further, the constant-current electric door lock drive circuit 26 includes an NPN type transistor Q3 which has the collector thereof connected to the electric door lock relay RY1 of the electric door lock circuit 25, an emitter thereof connected to the reference potential point through a resistance R6 and a base thereof connected to the control circuit 20 through a resistance R7. A connection point disposed between the base of the transistor Q3 and the resistance R7 is connected to the reference potential point through a resistance R8.

Further, the fixed voltage circuit 28 includes a constant-voltage diode ZD1, which has an anode thereof connected to the reference potential point and a cathode thereof connected to the base of the transistor Q1 of the reactance transistor circuit 21 through a protective resistance R9.

In each residential master station 2 shown in the drawing, the reactance transistor circuit 41 includes a NPN type transistor Q4 with a collector connected to the common line 3, an emitter connected to the power supply circuit 47 through a resistance R10 and a base connected to a resistance R17 of a fixed voltage circuit 48 which will be described later. Resistances R11, R12 are respectively inserted between the base and the collector and between the base and a connection point P2 where the resistance R10 is connected to the power supply circuit 47.

Further, the speech circuit 43 includes a handset HS1 with a microphone M2 and a receiver R1 to enable the resident in the residence to talk to a visitor at the main entrance. A microphone amplifier AMP3 amplifies speech signals generated from tones input to the microphone M2 of the handset HS1. A receiver amplifier AMP4 amplifies received speech signals to generate tones from the receiver R1 of the handset HS1. A NPN type transistor Q5 has a collector connected to the common line 3 through a load resistance R13 and the multiplex/separation circuit 42 and connected to the receiver amplifier AMP4 through a capacitance C2 and an adder circuit ADD2. An emitter of the transistor Q5 is connected to a reference potential point through a resistance R14. A base of the transistor Q5 is connected to the microphone amplifier AMP3. The adder circuit ADD2 is connected to a connection point between the base of the transistor Q5 and the microphone amplifier AMP3.

Further, the piezoelectric element circuit 46 includes a PNP type transistor Q6 which has an emitter connected to the common line 3, a collector connected to a resistance R15 and a base connected to the control circuit 40. A NPN type transistor Q7 has an emitter connected to the reference potential point through a resistance R16, a collector connected to the collector of the transistor Q6 through the resistance R15 and a base connected to the control circuit 40. A piezoelectric element PD1 for generating call tones has one end connected to a connection point between the collector of the transistor Q6 and the resistance R15 and has the other end thereof connected to the reference potential point.

Further, the fixed voltage circuit 48 includes a constant-voltage diode ZD2 which has an anode thereof connected to the reference potential point and a cathode thereof connected to the base of the transistor Q4 of the reactance transistor circuit 41 through a protective resistance R17.

In the line power supply 4 shown in the drawing, the passive reactance circuit 51 includes a coil L1. The frequency response leveling circuit 52 comprises a resistance R18 and a capacitance C3 connected in series between the ends of the coil L1 so as to be connected in parallel with the coil.

The manner of operation of the intercom system for a building or an apartment house according to one embodiment of the present invention having such a structure is explained hereinafter. An explanation of the operation of the lighting circuit 32 of the switch module 11 of the main entrance station 1 shown in the block diagram of FIG. 1 is omitted.

As shown in the block diagram of FIG. 1, the passive reactance circuit 51 of the line power supply 4 supplies stabilized direct current power, for example, DC 24V, to the common line 3 from the power supply circuit 50. This direct current power is supplied as standby operational power to the power supply circuit 27 through the reactance transistor circuit 21 of the talk module 10 of the main entrance station 1 installed at the main entrance and to the power supply circuit 47 through the reactance transistor circuit 41 of respective residential master stations 2, 2, . . . which are respectively installed in a plurality of residences. At the same time, the direct current power supply is received as the operational power by the electric door lock circuit 25 of the talk module 10 of the main entrance station 1 and the piezoelectric element circuits 46 of respective residential master stations 2, 2.

Here, as shown in the circuit block diagram shown in FIG. 2, the passive reactance circuit 51 of the line power supply 4 comprises the coil L1 which has given frequency characteristics of impedance increasing in proportion to frequency to impede passage of the audio and call signals from the common line 3 to the power supply circuit 50 while passing unimpeded the DC power to the common line. Accordingly, the transmission states of various signals (data signals, speech signals and the like) superimposed on the DC power on the common line and which are transmitted or received between the talk module 10 of the main entrance station 1 and the called residential master station 2 become unstable.

To solve the problem of instability due to proportional increase in impedance of the coil L1 to higher frequency components, the frequency response leveling circuit 52 is connected in parallel across the ends of the coil L1 of the passive reactance circuit 51 of the line power supply 4 to suppress the output impedance to the common line 3 to be equal to or less than 300Ω at the frequency of not less than 2 kHz. For example, the provision of the capacitance C3 connected in series with the resistance R18 suppresses the output impedance to the common line 3 to be equal to or less than 200Ω in the frequency range of 800 Hz–2 kHz. Accordingly, the output impedance to the common line 3 is maintained at 200–300Ω, for example, so that the transmission loss of the common line 3 can be reduced whereby the transmission states of various signals which are transmitted or received between the talk module 10 of the main entrance station 1 and the respective residential master stations 2 which are connected in parallel to the common line 3 are stabilized.

Further due to the above-mentioned control by the frequency response leveling circuit 52 of the line power supply 4, the output impedance to the common line 3 is maintained at 200–300Ω, for example, overcoming the influence of given frequency characteristics of the coil L1 of the passive reactance circuit 51. In such a case, the output voltages from the reactance transistor circuit 21 of the talk module 10 of the main entrance station 1 and the reactance transistor circuits 41 of respective residential master stations 2, 2, . . . to the power supply circuits 27, 47 shown in the circuit block diagram of FIG. 2, that is, the voltage levels V1, V2 of the connection points P1, P2, are respectively determined based on currents (collector currents) I1, I2 which flow in common to the reactance transistor circuits 21, 41 and the power supply circuits 27, 47. Accordingly, in the standby state in which the currents I1, I2 are small current values, the potential differences (voltage differences) between the collectors and the emitters of the transistors Q1, Q4 are small so that the dynamic ranges.are small. On the other hand, in the operational state in which the currents I1, I2 are large current values, the voltage differences between the collectors and emitters of the transistors Q1, Q4 become large and hence, the dynamic ranges become large so that it is impossible to ensure a fixed dynamic range.

By allowing currents to flow into the constant-voltage diodes ZD1, ZD2 of the fixed voltage circuit 28 of the talk module 10 of the main entrance station 1 and the fixed voltage circuit 48 of respective residential master stations 2, 2, . . . through the protective resistances R9, R17 when the current values of the currents I1, I2 are changed, the reactance transistor circuits 21, 41 draw a constant current. The voltage levels V1, V2 of the connection points P1, P2 are maintained at constant potentials so that a constant dynamic range is ensured.

Subsequently, in the block diagram shown in FIG. 1 when the visitor standing at the main entrance operates the call switch 31 of the switch module 11 of the main entrance station 1 to call the resident living in the specified residence, the call data signals output from the control circuit 30 in response to operation of the call switch are transmitted to each residential master station 2, 2, . . . through the control circuit 20, the data transmission/reception circuit 24, the multiplex/separation circuit 22 of the talk module 10 and the common line 3 shown in the circuit block diagram of FIG. 2.

Further, in each-residential master station 2, 2, . . . the control circuit 40 compares an address which forms the call data signals received through the common line 3, the multiplex/separation circuit 42 and the data transmission/reception circuit 45 with an address which is preliminarily set at its own terminal. If these addresses agree with each other, the voltage level of the base of the transistor Q6 of the pie zoelectric element circuit 46 is alternately shifted from the High level to the Low level and from the Low level to the High level so as to control the conductive/non-conductive state. At the same time, the voltage level of the base of the transistor Q7 is alternately shifted from the High level to the Low level and the Low level to the High level at a timing equal to the changeover of the level of the transistor Q6 so as to control the non-conductive/conductive state.

Further, when the transistors Q6, Q7 of the piezoelectric element circuit 46 are respectively controlled to the conductive state and the nonconductive state due to the control circuit 40 of the residential master station 2, a current which is a small current value based on the direct current power, for example, DC 24 V from the common line 3, is supplied to the piezoelectric element PD1 to energize the piezoelectric element PD1. The current is not supplied to the piezoelectric element PD1 from the power supply circuit 47 of low level at 5 V. When the transistors Q6, Q7 are respectively controlled to the non-conductive-state and the conductive state, the piezoelectric element PD1 becomes deenergized. By alternately repeating this energization/deenergization of the piezoelectric element PD1, the call tone is generated so that the resident living in the called residence is informed of a call from a visitor standing at the main entrance without lowering the alternating current impedance of the common line 3. Further, even when the voltage level of the direct current power from the common line 3 is changed, the transistors Q6, Q7 absorb the change of the voltage level so that the voltage applied to the piezoelectric element PD1 does not exceed specification.

Subsequently, as shown in the circuit block diagram of FIG. 2, when the called resident picks up the handset HS1 which forms the speech circuit 43, the speech function of the speech circuit 43 is activated. The microphone amplifier AMP3 and the receiver amplifier AMP4 are activated by the control circuit 40 which detects the pick up of the handset HS1. Response data signals from the control circuit 40 are transmitted to the talk module 10 of the main entrance station 1 through the data transmission/reception circuit 45, the multiplex/separation circuit 42 and the common line 3.

Further, in the talk module 10 of the main entrance station 1, the control circuit 20 detects the response data signals which are received through the common line 3, the multiplex/separation circuit 22 and the data transmission/reception circuit 24 and activates the speech function of the speech circuit 23, that is, activates the microphone amplifier AND1 and the speaker amplifier AMP2, for example.

The visitor standing at the main entrance speaks into the microphone M1 of the talk module 10 of the main entrance station 1 to establish communication between the visitor and the resident in the called residence. The speech signals are amplified by the microphone amplifier AMP1 and are transmitted through the base and the collector of the transistor Q2 and the load resistance R4 to the multiplex/separation circuit 22. The combined series resistance value of the output impedance, 200–300Ω in this embodiment, of the common line 3 (wherein the increase in impedance of the passive reactance circuit 51 of the line power supply 4 is limited by the frequency response leveling circuit 52) and of the load resistance R4, 470Ω, for example, becomes the transmission load resistance. The speech signals are therefore transmitted to the common line 3 at a constant output voltage (without any frequency dependent variation) with no transmission loss and are transmitted to the adder circuit ADD1 as feedback tone cancellation signals to cancel feedback tone signals transmitted to the adder circuit ADD1 through the capacitance C1 from the junction of the resistance R4 and collector of transistor Q2.

Further, the limiting of the frequency dependent impedance increase in the common bus 3 by the frequency response leveling circuit 52 enables the adder circuit ADD1 of the talk module 10 of the main entrance station 1 to cancel the feedback tone signals without the influence of changes in alternating current impedance of the common line 3 due to the frequency dependent characteristics of the choke circuit 51. Accordingly, the output of the feedback tone signals to the speaker SP1 through the speaker amplifier AMP2 are reduced so that the generation of howling is prevented.

Further, the input impedance of the speech circuit 43 of the called residential master station 2 is set sufficiently larger than the output impedance to the common line 3 as increased through the passive reactance circuit 51 of the line power supply 4, 200–300Ω in this embodiment. That is, the input impedance of the speech circuit is set to 20–30 kΩ. Accordingly, the speech signals can be received as speech signals having a voltage level which is substantially equal to the signal voltage of the speech signals from the main entrance station 1 which are transmitted through the common line 3 and the multiplex/separation circuit 42. The received speech signals are transmitted through the capacitance C2 and the adder circuit ADD2 and amplified by the receiver amplifier AMP4 to generate sounds at the receiver R1 of the handset HS1 as the received tones from the visitor standing at the main entrance.

On the other hand, when the resident inside the called residence speaks into the microphone M2 of the handset HS1 of the speech circuit 43 of the residential master station 2 to establish conversation between the resident and the visitor standing at the main entrance, the speech signals are amplified through the microphone amplifier AMP3 and transmitted through the base and the collector of the transistor QS and the load resistance R13 to the multiplex/separation circuit 42. The combined series resistance value of the output impedance, 200–300Ω in this embodiment, of the common line 3 (wherein the frequency dependent increase in impedance by the passive reactance circuit 51 of the line power supply 4 is limited by the frequency response leveling circuit 52), and of the load resistance R13, 470Ω, for example, becomes the transmission load resistance. The speech signals are therefore transmitted to the common line 3 at a constant output voltage (no frequency dependent voltage variation) with no transmission loss. Feedback cancellation signals from amplifier AMP3 are transmitted to the adder circuit ADD2 to cancel feedback tone signals transmitted to the adder circuit ADD2 through the capacitance C2 from the junction of resistance R 13 and the collector of transistor Q5.

Further, the cancellation of the feedback tone signals by the adder circuit ADD2 of the speech circuit 43 of the residential master station 2 is not affected by frequency dependent changes in the alternating current impedance of the choke circuit 51 since such frequency dependent changes in impedance are limited by the frequence response leveling circuit 52. Thus the output of the feedback tone signals to the receiver R1 of the handset HS1 through the receiver amplifier AMP4 is reduced whereby the generation of the howling is prevented.

Further, the input impedance of the speech circuit 23 of the talk module 10 of the main entrance station 1 is set sufficiently larger than the output impedance to the common line 3 as increased through the passive reactance circuit 51 of the line power supply 4, 200–300Ω in this embodiment. That is, the input impedance of the speech circuit 23 is set to 60–80 kΩ, for example. Accordingly, the speech signals can be received as speech signals having a voltage level which is substantially equal to the signal voltage of the speech signals from the residential master station 2 which are transmitted through the common line 3 and the multiplex/separation circuit 22. The speech signals are transmitted through the capacitance C1 and the adder circuit ADD1 and amplified by the speaker amplifier AMP2 to generate sounds at the speaker SP1 as the received tones from the resident in the inside of the called residence.

Subsequently, as shown in the block diagram of FIG. 1 and the circuit block diagram of FIG. 2, when the resident in the called residence operates the electric door lock releasing button 44 of the residential master station 2 to release the electric door lock 5 which is installed at the entrance door of the main entrance, the door lock releasing signal is output from the control circuit 40 in response to operation of the door lock releasing button 44. The door lock releasing signal is transmitted to the control circuit 20 of the talk module 10 of the main entrance station 1 through a path similar to the path for the above-mentioned response data signals.

Further, responsive to detection of the door lock releasing signal from the residential master station 2, the control circuit 20 of the talk module 10 of the main entrance station 1 controls the transistor Q3 to the conductive state by shifting the voltage level of base of the transistor Q3 from the Low level to the High level through the resistance R7 of the door lock drive circuit 26.

Further, when the transistor Q3 of the constant-current electric door lock drive circuit 26 is controlled to the conductive state with the use of the control circuit 20 of the talk module 10 of the main entrance station 1, without using the low voltage such as 5 V from the power supply circuit 27, but rather uses a small current value of the direct current power, for example, DC 24 V from the common line 3 supplied to the electric door lock relay RY1 to open the electric door lock switch SW1 whereby the electric door lock 5 can be released without lowering the alternating current impedance of the common line 3. Further, with the control circuit 20, even when the voltage level of the direct current power supply of the common line 3 is changed, the transistor Q3 absorbs the change of the voltage level so that voltage does not exceed specification.

Then, as shown in the block diagram of FIG. 1, when a visitor standing in front of the residential front door operates the call switch 6 to call the resident inside of the residence, the call signal is transmitted to the control circuit 40 of the residential master station 2.

The call signal output from the call switch 6 is detected by the control circuit 40 of the residential master station 2 and controls the transistors Q6, Q7 of the piezoelectric element circuit 46 shown in the circuit block diagram of FIG. 2 respectively to the conductive state and the non-conductive state to supply a small electric current from the common line 3, for example DC 24V to the piezoelectric element PD1. That is, the current supplied to the piezoelectric element PD1 is not the power supply of low level at 5 V from the power supply circuit 47. By alternating the state of the piezoelectric element PD1 between the ON state and the OFF state, the call tone is generated so that the resident inside the residence is informed of the call from the visitor standing at the residential front door. Further, with the control circuit 20, even when the voltage level of the direct current power supply of the common line 3 is changed, the transistors Q6, Q7 absorb the change of the voltage level so that the voltage applied to the piezoelectric element PD1 does not exceed specification.

As can be clearly understood from the above description, according to the intercom system for a building or an apartment house of the present invention, by suppressing the respective impedance at the high region by the frequency responsive leveling circuit which is connected in parallel with the choke circuit of the line power supply when the frequency on the common line becomes high, the increase in output impedance to the common line is limited to the given impedance. The line impedance and voltage regulating circuits perform the constant-current operation due to the control performed by the fixed voltage circuits receiving the power from the line power supply at the main entrance station and at the residential master stations. Accordingly, even when the main entrance station, the residential master stations and the line power supply are connected to the common line in parallel, frequency dependent changes of the alternating current impedance on the common line is prevented.

Further, by connecting the speech circuits having the load resistances to the line impedance and voltage regulating circuit of the talk module of the main entrance station and the line impedance and voltage regulating circuits of respective residential master stations in series, it becomes possible to sufficiently cancel the feedback tone signals without being affected by frequency dependent changes of the alternating current impedance on the common line whereby the generation of the howling is prevented.

Still further, the power supply to the constant-current electric door lock drive circuit of the talk module of the main entrance station and the power supply to the piezoelectric element circuits of the residential master stations which generate the call tones are supplied small electric currents from the direct-current power supply through the common line to avoid drawing current from the low-level voltage supplies which are stabilized inside the talk module and inside the residential master stations.

What is claimed is:

1. An intercom system for a building or an apartment house comprising:

a common line;

at least one main entrance station and a plurality of residential master stations connected to in parallel said common line;

a line power supply for suppling DC power to the common line to provide power to operate said plurality of residential master stations;

said at least one main entrance station including a switch module with a call switch for generating call signals on the common line superimposed on the DC power to selectively call one of said plurality of residential master stations, and a main entrance speech circuit for responding to a main entrance user's voice to generate audio signals on the common line superimposed on the DC power and for responding to audio signals on the common line to generate sound audible to the main entrance user;

each of said plurality of residential master stations including a reception circuit for responding to a corresponding call signal on the common line, and a residential speech circuit for responding to a residential user's voice to generate audio signals on the common line superimposed on the DC power and for responding to audio signals on the common line to generate sound audible to the residential user; and said line power supply including a choke circuit having an impedance which increases with increasing frequencies on the common line to pass unimpeded said DC power to said common line and to impede passage of said audio signals and said call signals from said common line to said line power supply; and said line power supply further including a frequency response leveling circuit which shunts the choke circuit with a fixed impedance at frequencies in the range of the audio signals.

2. An intercom system according to claim 1 wherein said choke circuit comprises an inductance connecting said line power supply to said common line and said frequency response leveling circuit includes a capacitance in series with a resistance connected across the inductance.

3. An intercom system according to claim 2 wherein the series capacitance and resistance shunts the inductance to provide an impedance to the common line in the range of 200 ohms to 300 ohms in the frequency range of 800 hertz to 2000 hertz.

4. An intercom system according to claim 1 wherein the frequency response leveling circuit shunts the choke circuit to provide an impedance to the common line in the range of 200 ohms to 300 ohms in the frequency range of 800 hertz to 2000 hertz.

5. An intercom system according to claim 4 wherein each of the residential master stations includes a residential impedance and voltage regulating circuit connected to the common line for providing a fixed voltage supply to the corresponding residential master station.

6. An intercom system according to claim 1 wherein each of said residential master stations includes a piezoelectric element circuit connected to the common line for generating a call tone when the reception circuit responds to a corresponding call signal on the common line.

7. An intercom system according to claim 1 wherein each of the residential master stations includes a residential impedance and voltage regulating circuit connected to the common line for providing a fixed voltage supply to the corresponding residential master station.

8. An intercom system according to claim 1 wherein the main entrance station includes an electric door lock drive circuit connected to the common line for driving an electric door lock circuit which locks and releases an electric door lock.

\* \* \* \* \*

UNITED STATES PATENT AND TRADEMARK OFFICE
CERTIFICATE OF CORRECTION

PATENT NO.   : 6,671,360 B2
DATED        : December 30, 2003
INVENTOR(S)  : Sumiya et al.

It is certified that error appears in the above-identified patent and that said Letters Patent is hereby corrected as shown below:

Column 1,
Line 36, delete "door of a the building" should read -- door of a building --.

Column 2,
Line 2, delete period.
Line 3, insert period after "102,102" and begin new paragraph with -- When --.

Column 4,
Line 49, "current value is supplied" should read -- current value supplied --.

Column 6,
Line 40, "generates.a" should read -- generates a --.

Column 7,
Line 13, "generate" should read -- generates --.

Column 9,
Line 37, "ranges.are" should read -- ranges are --.

Column 13,
Line 48, "connected to in parrallel said" should read -- connected to and in parrallel with said --.

Signed and Sealed this

Twenty-fourth Day of August, 2004

JON W. DUDAS
*Director of the United States Patent and Trademark Office*